Patented Sept. 11, 1923.

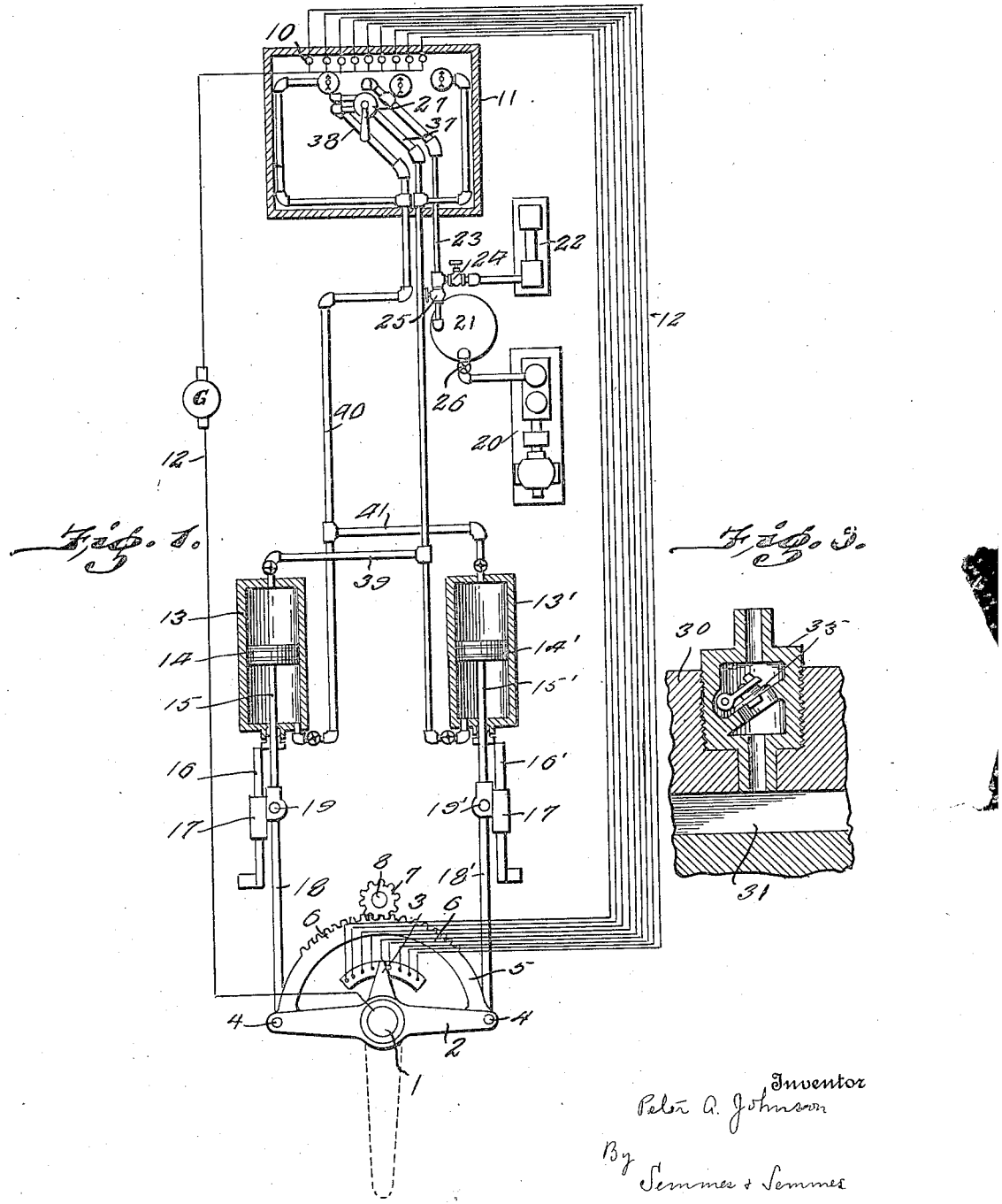

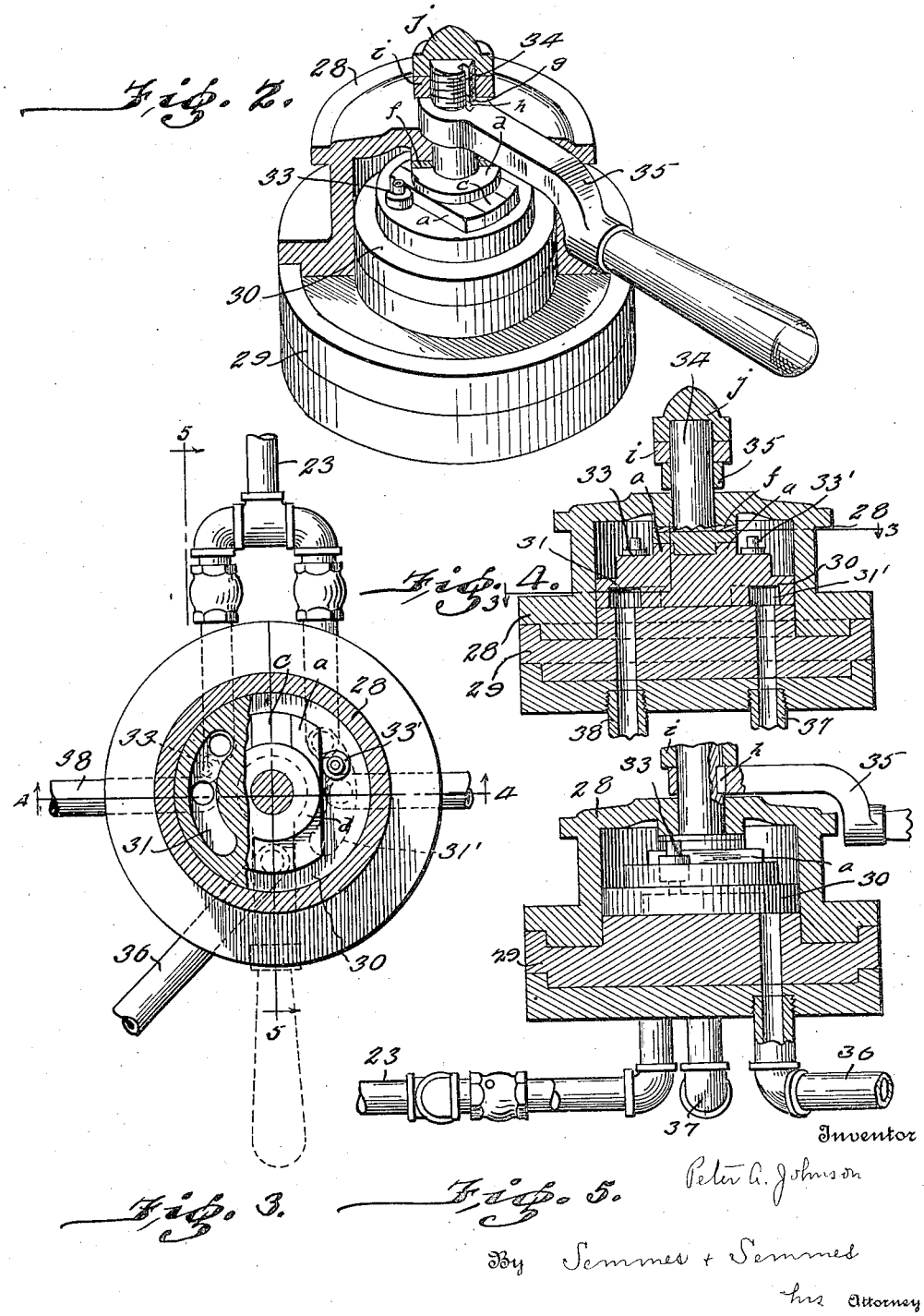

1,467,981

UNITED STATES PATENT OFFICE.

PETER A. JOHNSON, OF PORTLAND, OREGON.

VALVE.

Application filed July 26, 1921, Serial No. 487,790. Renewed June 18, 1923.

*To all whom it may concern:*

Be it known that I, PETER A. JOHNSON, a citizen of the United States, residing at Portland, in the county of Multnomah and State of Oregon, have invented certain new and useful Improvements in Valves, of which the following is a specification.

My invention relates to valves, and more particularly to valves designed to control elastic fluid under large pressure.

An object of my invention is to design a valve which will allow the accumulated, compressed fluid in the upper part of the controller shell to counteract the pressure of the fluid in the lower part of the valve.

Another object of my invention is to design a valve which will permit of the ready control of fluid from a source of supply to the operating mechanism and likewise from the operating mechanism to the exhaust.

With these and other objects in view which may be incident to my improvements, the invention consists in the parts and combinations to be hereinafter set forth and claimed, with the understanding that the several necessary elements comprising my invention, may be varied in construction and arrangement without departing from the spirit and scope of the appended claims.

In order to make my invention more clearly understood, I have shown in the accompanying drawings means for carrying the same into practical effect, without limiting the improvements in their useful applications to the particular constructions, which for the purpose of explanation, have been made the subject of illustration.

In the drawings:

Figure 1 is a diagrammatic view of my device upon a vessel.

Figure 2 is a perspective view of the controller, with the upper cover broken away showing the base, the valve seat and the valve.

Figure 3 is a sectional view of the valve on the line 3—3 of Figure 4.

Figure 4 is a section on the line 4—4 of Figure 3.

Figure 5 is a section on the line 5—5 of Figure 3.

Figure 6 is a cross-sectional view of my improved check valve.

Mounted upon a rectangular post 1 is a horizontal tiller arm 2 rigidly secured at right angles to the post and provided with a contact arm 3 which also acts as a pointer, in line with the rudder and pointing toward the prow of the ship. This arm or pointer extends from the inner central portion of the tiller arm, which latter at its outer ends is provided with openings 4 to be hereinafter described. Extending forwardly from the tiller arm and forming a part thereof is a curved metallic bar or quadrant 5 provided in its exterior surface with teeth 6 that intermesh with a pinion 7 whose vertical shaft 8 is provided with any suitable means for manually steering the ship. This arrangement is provided out of abundant caution so that if the hydraulic or pneumatic means for any reason should fail to function, the ship may be steered by hand.

Within the quadrant and so positioned that the contact arm 3 will operate across its face is a contact plate 9, the same being connected with a tell-tale system whose indicator 10 is located in the pilot house or other enclosure 11, the two portions of the system being connected by the wires 12, as shown in Figure 1. A generator G or other suitable source of electricity furnishes the necessary current to operate the system, the object of which is to indicate to the helmsman the exact position of the rudder at all times.

On opposite sides of the center line of the ship are two cylinders 13 and 13' each having piston heads 14 and 14' and piston rods 15 and 15' extending therefrom. These cylinders are placed forward of the tiller arm and appropriately located with respect to each end thereof. Securely attached to the rear end of the cylinders and in parallel alignment with the piston rods are guide bars 16 and 16' upon which operate cross heads 17 and 17', securely mounted upon the guide bars and rigidly secured upon their outer end to the piston rods. Connecting rods 18 and 18' are also pivotally mounted in the cross heads, opposite the ends of the piston rods by means of pins 19 and 19', the farther ends of said rods being pivoted in the respective ends of the tiller arm 2, by means of pins 4 and 4'.

The cylinders referred to are connected by a suitable system of piping with one another and with an air compressor 20 of the usual or any approved construction which in turn is connected with a pressure tank 21. The system of piping is further connected with a hydraulic pump 22 and both the air compressor and the hydraulic pump are each connected to the main supply pipe 23 by means of which either air, or other fluid as desired may be supplied to the system for the operation of the rudder, there being, of course, appropriate valves such as indicated at 24, 25 and 26, whereby either the air or the fluid may be cut off from the system. The pipe 23 extends directly to the pilot house and between it and the rest of the system of piping is interposed a four-way valve controller 27 which regulates to a nicety the amount of air or other fluid pressure in the cylinders, thereby securing the desired movement of the rudder.

The controller mechanism includes a housing or shell and valve mechanism, the housing or shell consisting of two parts 28 and 29. The part 28 is cylindrical in form and with the base part 29 forms a perfect airtight case for valve 30. Communicating with the part 29 are the beforementioned pipes 23, 37 and 38 each being open into the ports 31 and 31' and thence to fore and aft ends of cylinders 13 and 13'. Seated immediately upon the base part 29 and rotatable within the part 28 is a valve 30. The upper portion of the valve disc 30 is cast with integral shoulders or ridges $a$ and in the depression $b$ between them fits a cross bar $c$ upon the lower end of the stem. A boss $d$ rests upon the shoulders $a$ and between the boss and the under sides of the shell 28 is a leather washer $f$. The upper end of the valve stem extends through an aperture in the top of the shell, is screw threaded and provided with a slot $g$ and a handle 35 which is securely held to the valve stem by a key $h$. Above is a lock-nut $i$ and a cap-nut $j$. These details of construction are for the purpose of insuring absolute accuracy of adjustment in putting the several parts together.

On the face of the valve 30 adjacent the valve seat are two curved oppositely disposed recessed ports 31 and 31'. Extending through the valve 30 and forming a means of communication between the valve ports 31 and 31' and the upper part of the shell are two non-return check valves 33 and 33'. The structure of this valve is more clearly shown in Figure 6. These valves as seen in Figure 6 permit the ready passage of air or any other fluid upward through the valve into the cavity in the upper part of the shell but prevent any return flow of the air or other fluid. The purpose of this non-return check valve is to permit a pressure in the upper part of the shell sufficient to counteract the pressure below the valve due to pressure from the source of air supply through the pipe 23. Without this provision the air pressure might raise somewhat the valve 30 and permit an internal passage of the air between the part 29 and the valve 30.

As will be seen from Figure 3, the position of the valve ports 31 and 31' may be determined by the movement of the handle 35. In Figure 3 the air pressure through the pipe 23 passes into the valve ports 31 and 31' and also through the pipes 37 and 38 to the cylinders 13 and 13' producing equal pressure in both at both sides of pistons 14 and 14' and thereby holding the rudder in one position. However, if the handle 35 is moved to the right in Figure 3 the valve port 31 is moved so as to close the opening from pipe 23 to 31 and cause the pipe 38 to communicate with the pipe 36 and the valve port 31' retains communication between the pipes 23 and 37. In this way pressure passes through the pipe 37 into the after part of the cylinder 13' and the forward part of the cylinder 13 while through the pipe 38 air is exhausted from the after part of cylinder 13 and the forward part of cylinder 13' through the pipe 36, to the atmosphere.

The opposite results are accomplished whenever the handle 35 is moved to the left hand as shown in Figure 3. As can readily be seen from an inspection of Figures 3, 4 and 5, the pressure through the pipe 23 has a tendency to displace the valve 30 and to permit the air to pass wastefully into the pipes not in communication with the pipe 23, by either the valve connections 31 or 31'.

The area of the ports 31 and 31' are about three square inches, which at an air pressure of 100 pounds per square inch would exert a lifting force of 300 pounds on the bottom of the revolving plate 30 and raise it off its seat, therefore the small check valves 33 and 33' are placed one on each side directly over 31 and 31' with a small port opening into each admitting air from the feed lines through and above the revolving plate 30. The area of the top of the revolving plate is about 9 square inches and hence there is exerted thereon a downward pressure, making what is known as a balanced valve, the downward pressure in this instance being about 900 pounds.

It is to be noted that the valve ports are arranged to lap in a manner to cut off the exhaust and permit air to enter the cylinder pipes as predetermined for the operation. Only sufficient air is permitted to escape from opposing sides of the piston heads to adjust the rudder to a predetermined position for steering a desired course, and to equalize the pressure on the exhausting sides with that on the opposing sides coming directly from the pressure tank, to retain the rudder when thus set. When the necessary amount of air is exhausted, the controller valve is returned to original position, closing exhaust port and opening feed pipe 23 to pipe 38 and air admitted on both sides of the piston heads with pressure equalized. and the rudder adjusted to the precise course desired. It is only when the valve 30 is operated by handle 35 that a change of rudder position results as desired.

Should the pneumatic system fail for any cause, the valve 26 should be closed, and the valve 24 opened, when the auxiliary hydraulic system is substituted to operate the steering apparatus, in the manner hereinbefore described for the pneumatic system. It is to be noted that with the pneumatic system, the piston heads are cushioned upon air and any impact upon the rudder from an external source is resiliently received, and the pistons immediately return to the predetermined set position, the pressure on either side of the piston heads being stabilized by air under suitable compression. Further, the liability of the rudder and its cooperating parts to get out of order or to break, is overcome. This result is not possible with the hydraulic system, yet for emergency purposes, the use of such system, is as satisfactory as any system devised prior to the pneumatic system herein described.

I claim as my invention:

1. In a valve mechanism, a valve housing having a valve seat, a valve mounted within the valve seat, said valve having slots forming valve ports to permit the passage of fluid from one pipe to another, and one way valve openings leading from the valve ports into the housing whereby the passage of fluid into the housing produces a pressure tending to hold the valve seated.

2. In a valve mechanism, a base part and a cylindrical part, said base part and cylindrical part forming a housing, the base part having openings therein for the passage of fluids, a valve seated within the housing and having two oppositely disposed slots therein for valve ports to permit the passage of fluids from one pipe to another, and a second valve in said first named valve to permit the flow of fluid from the valve ports into the housing.

3. In a valve mechanism, a base part and a cylindrical part, said base part and cylindrical part forming a housing, the base part having two supply openings, two line pipe openings and an exhaust opening therein for the passage of fluids, a valve seated within the housing and having oppositely disposed slots therein for the valve ports to permit the passage of fluid from one pipe to said oppositely disposed slots, when the valve is in normal position, thus permitting the free passage of fluid from the supply pipes to the line pipes; when in another position, permitting the free passage of fluid from one supply pipe to one line pipe and from the other line pipe and to the exhaust pipe and when in the third position the other supply pipe is in communication with the last named pipe, and the first named line pipe is in communication with the exhaust pipe.

4. In a valve mechanism, a base part and a cylindrical part, said base part and cylindrical part forming a housing, the base part having two supply openings, two line pipe openings and an exhaust opening therein for the passage of fluids, a valve seated within the housing and having oppositely disposed slots therein for the valve ports to permit the passage of fluid from one pipe to said oppositely disposed slots, when the valve is in normal position, thus permitting the free passage of fluid from the supply pipes to the line pipes; when in another position, permitting the free passage of fluid from one supply pipe to one line pipe and from the other line pipe and to the exhaust pipe and when in the third position the other supply pipe is in communication with the last named pipe, and the first named line pipe is in communication with the exhaust pipe, said valve having valve controlled openings leading from the valve ports into the housing.

5. In a valve mechanism, a valve housing having a valve seat, a valve mounted within the valve seat, and a one way valve opening leading from the valve seat into the housing whereby the passage of fluid into the housing produces a pressure tending to hold the valve seated.

6. In a valve mechanism, a valve housing having a valve seat, a valve mounted within the valve seat, said valve having passageways to permit the passage of fluid, and one way valve openings leading from said passageways into the housing whereby the passage of fluid into the housing produces a pressure tending to hold the valve seated.

7. In a valve mechanism, a valve housing having a valve seat, a valve mounted within the valve seat, said valve having two slots forming valve ports to permit the passage of fluid, and a one way valve opening for each slot whereby fluid may pass into the housing to produce a pressure tending to seat the valve.

8. In a valve mechanism, a valve housing having a valve seat, a valve mounted within the valve seat, and one way valve openings passing through the valve and leading from the valve seat into the housing, whereby the passage of fluid into the housing produces a pressure tending to seat the valve.

9. In a valve mechanism, a valve housing having a valve seat, a valve mounted within the valve seat, said valve having two passageways forming ports to permit the passage of fluid, and a one way valve opening for each passageway extending through the valve, whereby fluid may pass into the housing to produce a pressure tending to seat the valve.

In testimony whereof I affix my signature.

PETER A. JOHNSON.